United States Patent [19]

Kahan

[11] 3,738,697

[45] June 12, 1973

[54] PORTABLE COLLECTOR APPARATUS

[76] Inventor: Edward Kahan, 8 Alderwood Lane, Syosset, N.Y. 11791

[22] Filed: June 18, 1971

[21] Appl. No.: 154,471

[52] U.S. Cl. .............................. 294/19 R, 294/115
[51] Int. Cl. ............................................ A47f 13/06
[58] Field of Search ...................... 294/19 R, 160; 220/31 S

[56] References Cited
UNITED STATES PATENTS

| | | | |
|---|---|---|---|
| 3,446,525 | 5/1969 | Jones | 294/19 R |
| 2,366,233 | 1/1945 | Berg | 294/19 R |

Primary Examiner—Richard E. Aegerter
Assistant Examiner—Johnny D. Cherry
Attorney—Seidman and Fisher

[57] ABSTRACT

A portable collector apparatus having a disposable container with hingedly connected halves releasably supported by tongs at the end of an extended handle. A slide rod operable from the other end of the handle effects pivoting of the tongs to swing the container halves from an opened configuration to a closed, self-locking configuration for receiving and enclosing matter to be collected.

6 Claims, 6 Drawing Figures

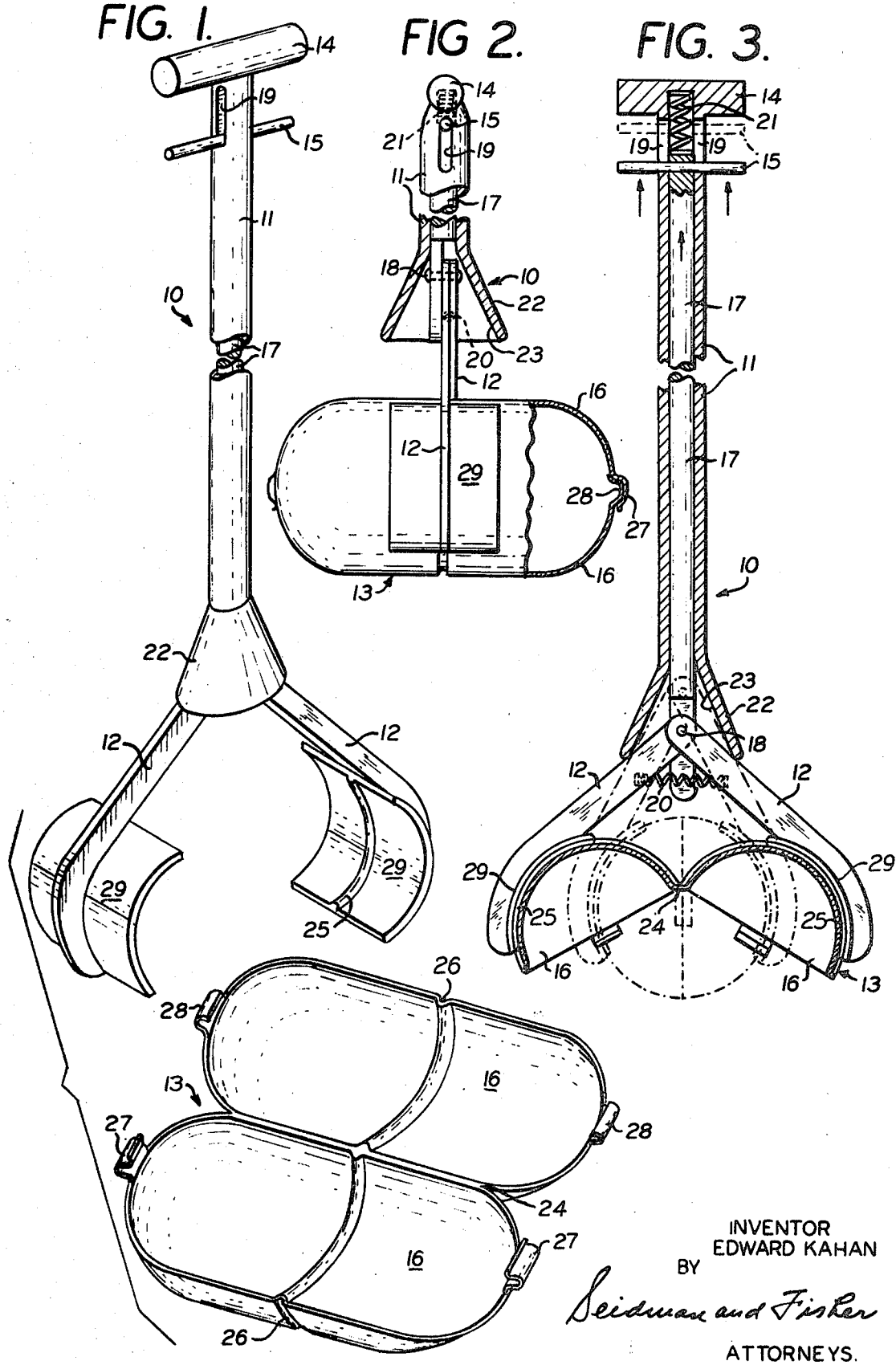

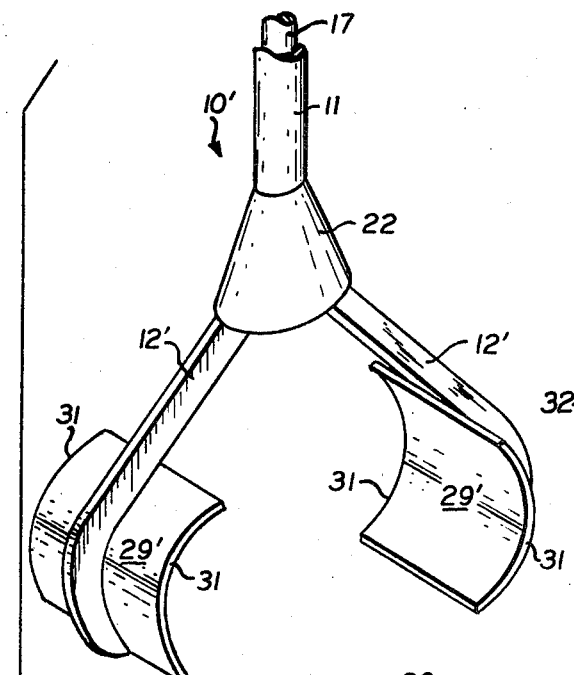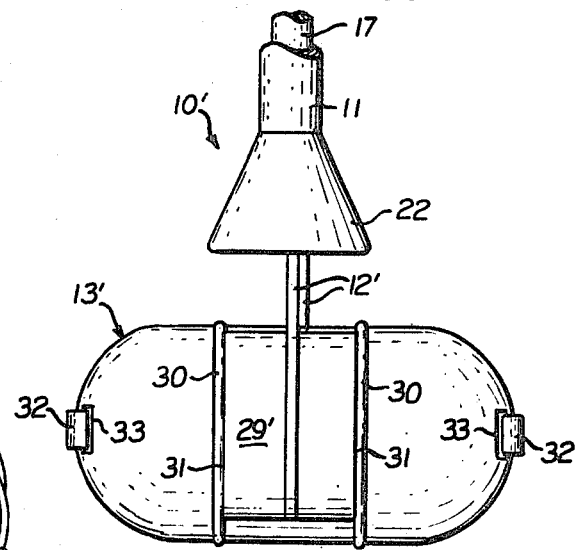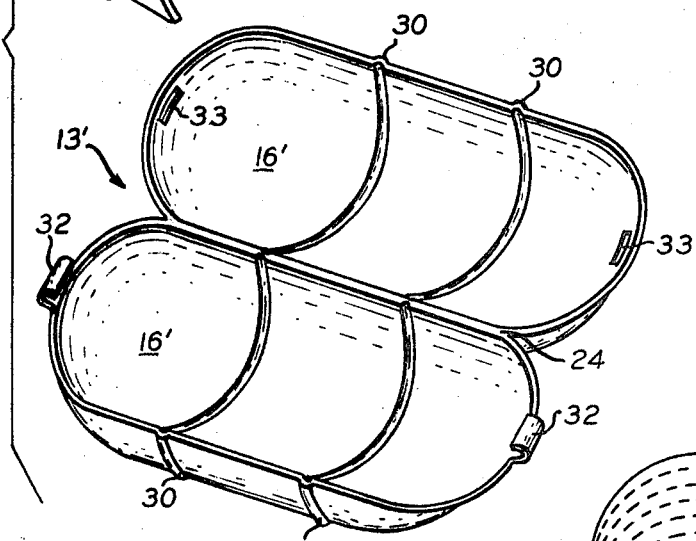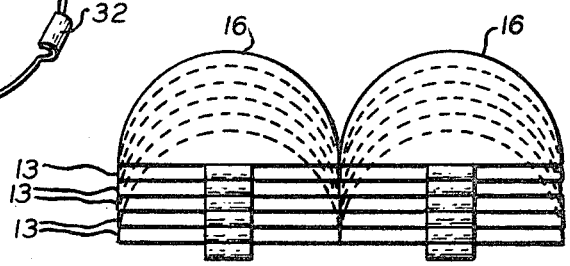

PORTABLE COLLECTOR APPARATUS

BACKGROUND AND SUMMARY OF THE INVENTION

The present invention relates in general to portable collector equipment and more particularly to a portable collector apparatus especially suitable for the collection and disposal of animal feces.

In many communities there have been enacted ordinances which make pet owners liable to a fine for failure to clean up fecal deposits left by their animals. Even in communities without such ordinances, many pet owners do undertake to keep the landscape free from accumulations of animal discard. Accordingly, there exists a need for a portable collector device which is capable of picking up and containing for ultimate disposal, animal feces and other unsavory matter to be collected.

The invention meets such need by providing a portable collector apparatus with a disposable container. The container has hingedly connected halves that engage and are releasably supported by tongs at one end of an extended handle. A slide rod operable from the other end of the handle and extending axially therein effects pivoting of the tongs to swing the container halves from an opened configuration to a closed, self-locking configuration for receiving and enclosing matter to be collected.

The container itself is made as a one-piece unit molded from cardboard, paper mache, plastic, or any other suitable material.

For a fuller understanding of the invention, reference should be had to the following detailed description and accompanying drawings exemplifying preferred embodiments of the invention.

BRIEF DESCRIPTION OF THE DRAWING

FIG. 1 is an exploded perspective view of a portable collector apparatus according to a preferred embodiment of the invention.

FIG. 2 is a side elevation view, partly in section and partly broken away, of the handle and disposable container used in the collector apparatus of FIG. 1, illustrating the container in its closed state after use and rotated 90° from its normal position to show details of its self-locking parts.

FIG. 3 is an end elevation view, partly in section and partly in phantom, of the collector apparatus shown in FIG. 1, illustrating in full outline the apparatus with the container in an open state ready for use, and illustrating in phantom the apparatus with the container in a closed state after use.

FIG. 4 is an exploded perspective view of a portable collector apparatus according to another embodiment of the invention, and which has a handle and operating mechanism similar to the apparatus shown in FIG. 1.

FIG. 5 is a side elevation view of the collector apparatus of FIG. 4 as seen with the container in a closed state, and FIG. 6 is an end view of a plurality of containers of the type used in the collector apparatus of the invention, as seen stacked together for compactness.

DESCRIPTION OF THE PREFERRED EMBODIMENTS OF THE INVENTION

In FIGS. 1-3 there is shown a portable collector apparatus 10 having an extended and hollow handle 11, a pair of tongs 12 supported by handle 11 at one end thereof, and a disposable container 13 releasably supported by tongs 12.

Handle 11 is of a length convenient to enable the user, while holding grip 14 and draw bar 15 in one hand, to position container 13 near enough to the ground (not shown) so that the container half sections 16 can be swung together by tongs 12 from an opened configuration to a closed configuration, as shown in FIG. 3, to receive and enclose the animal feces or other matter to be collected and removed from the ground. Approximately three feet is a generally suitable length for handle 11.

Tongs 12 are disposed for pivotal movement relative to each other between a maximum spaced position (shown in full outline in FIG. 3), in which position container 13 is in an opened configuration, to a minimum spaced position (shown in phantom in FIG. 3), in which position container 13 is in its closed configuration.

For effecting such movement of tongs 12, the invention provides an actuator means including a rod 17 extending within handle 11 and pivotally connected to both tongs 12 at 18. Rod 17 is axially movable relative to handle 11 with the aid of draw bar 15 which extends transversely through guide slots 19 in handle 11. A spring 20 spreads apart tongs 12 and resiliently biases them toward their maximum spaced position. Another spring 21 within handle 11 urges rod 17 outward toward a preset outer limit position. At the working end of handle 11 there is provided a conical flared part 22 the inside of which defines a cam surface 23 disposed for engagement with tongs 12 to forcibly move same together toward their minimum spaced position when rod 17 is drawn inwardly by pulling bar 15 toward grip 14.

Accordingly, the actuator means employed by the invention can be characterized as one with a rod 17 axially movable in one direction, i.e. outwardly, to spread tongs 12 apart, and axially movable in the opposite direction, i.e. inwardly, to swing the tongs 12 together. The amount of axial travel for rod 17 is limited by the length of slots 19. The maximum angular spread of tongs 12 is not critical and can be approximately that shown in FIG. 3, i.e. about 100° to 120°, and is controlled by the dimensions of the flared part 22.

Container 13 is expediently made in the form of a body of revolution longitudinally split into a pair of half sections 16 joined together by a flexible, resilient hinge piece 24.

For disposability and expediency, container 13 is molded as one piece from cardboard, paper mache, plastic, or any other suitable material, and is molded in the spread-apart configuration defining the fully open container 13 state, i.e. with sections 16 spread 180° apart about the pivot axis defined by hinge 24. Thus, the sections 16 will have to be pivoted together somewhat to insert the container 13 upon the opened tongs 12, as shown in FIG. 3, and when received by tongs 12, the resiliency of hinge 24 will bias both sections 16 into bearing engagement with tongs 12, thereby giving a collector apparatus 10 in which the container 13 is releasably supported by the tongs 12, and is automatically held in place by tongs 12 ready for use.

To secure container 13 in a predetermined position relative to tongs 12, the tongs 12 are provided with raised rib surfaces 25 that engage into corresponding groove surfaces 26, molded into the container sections 16.

Container 13 is self-locking once closed, so that the tongs 12 can be retracted to allow disposal of the container 13 and its contents without any danger of spillage. This self-locking feature is achieved by spring clips 27 and 28 integral with the sections 16. Spring clips 27 are provided on one section 16, and a somewhat different type of spring clips 28 are provided on the other section 16. When the two sections 16 are swung together to close the container 13, clips 28 are slipped into and gripped by corresponding clips 27, as seen in FIG. 2.

In FIGS. 4 and 5 there is shown a portable collector apparatus 10' that is similar to the collector apparatus 10 as to long actuation and biasing, but differs therefrom as to the manner of securing the container against slippage, and for such reason uses a somewhat different design of container 13'.

In the case of container 13, slippage is prevented by ribs 25 provided on the curved flanges 29 of tongs 12, whereas in apparatus 10' the tongs 12' have flanges 29' without any ribs. On container 13' there are provided on each section 16', two integrally formed, circumferential ribs 30 that are spaced-apart so as to engage corresponding edges 31 of flanges 29' when container 13' is inserted on the tongs 12'. The engagement of ribs 30 against edges 31 prevents axial shifting of container 13' relative to tongs 12'.

Container 13' is also self-locking upon closure, and for such purpose has on one of its sections 16', two spring clips 32 that engate into corresponding slots 33 provided in the other section 16'.

As can be appreciated by the artisan, any suitable prior art type of latching parts can be substituted for those shown on the self-locking containers 13 and 13'.

It is desirable that, whatever style of container 13 or 13' is used, it be possible to store a multiplicity of containers 13, 13' compactly. Accordingly, the container sections 16, 16' have concave interior surfaces and convex exterior surfaces that are contoured to accommodate stacking together of a plurality of similar open containers nested one against the other as exemplified in FIG. 6.

The collector apparatus 10, 10', except for the container 13, 13' used, can be made of metal, plastic, or any other suitable material.

There is thus provided a portable collector apparatus 10, 10' whereby the collection of animal feces is readily achieved without the user being required to bend, or in any way physically contact the matter being collected.

While the present invention has been described with respect to a preferred apparatus for effecting the invention it will be readily understood and appreciated that variations and modifications may be made for departing from the spirit and scope of the invention as set forth in the appended claims.

What is claimed is:

1. A portable collector apparatus which comprises an extended handle, a pair of tongs supported by said handle at one end thereof, resiliently biased apart toward a maximum spaced position and disposed for angular movement relative to each other between said maximum spaced position and a minimum spaced position, and a container having sections connected by a resilient hinge and moveable by and with said tongs from an opened configuration to a closed configuration for receiving and enclosing matter to be collected, said resilient hinge being operable to urge the container sections into bearing engagement with the tongs.

2. A portable collector apparatus according to claim 1 including actuator means extending within said handle and connected to said tongs for pivotally moving same to said maximum and minimum spaced positions selectively.

3. A portable collector apparatus according to claim 2 wherein said actuator means includes a rod axially movable in one direction to move said tongs apart toward said maximum spaced position, and axially movable in the opposite direction to move said tongs together toward said minimum spaced position.

4. A portable collector apparatus according to claim 2 including means connected to said handle and defining a cam surface disposed for engagement with said tongs to forcibly move same together toward said minimum spaced position when the rod is moved in said opposite direction.

5. A portable collector apparatus according to claim 4 wherein said tongs and container sections have corresponding matching surfaces that engage to secure the container in a predetermined position relative to the tongs.

6. A portable collector apparatus according to claim 1 wherein said container sections have respective parts disposed for locking engagement, when the tongs are in said minimum spaced position, to secure the container in the closed configuration.

* * * * *